United States Patent [19]

Velazquez

[11] 3,807,662
[45] Apr. 30, 1974

[54] ANTI-TORQUE, PROPULSION, AND DIRECTIONAL CONTROL SYSTEM

[75] Inventor: Joseph L. Velazquez, Burbank, Calif.

[73] Assignee: Lockheed Aircraft Corporation, Burbank, Calif.

[22] Filed: Nov. 13, 1972

[21] Appl. No.: 306,359

[52] U.S. Cl........ 244/17.19, 239/265.19, 244/17.21
[51] Int. Cl. ........................................... B64c 27/82
[58] Field of Search........... 244/17.19, 17.21, 17.11, 244/17.23, 52, 82, 6, 7, 7 A, 7 R; 239/265.11, 265.27, 265.19

[56] References Cited
UNITED STATES PATENTS

| | | | |
|---|---|---|---|
| 3,112,616 | 12/1963 | Adamson et al. | 239/265.27 UX |
| 3,026,068 | 3/1962 | Spearman | 244/17.19 X |
| 3,351,304 | 11/1967 | Stein et al. | 244/17.19 |
| 3,059,877 | 10/1962 | Lee | 244/17.19 |
| 3,582,022 | 6/1971 | Robinson | 244/17.21 |
| 2,369,652 | 2/1945 | Avery | 244/17.21 X |
| 3,087,303 | 4/1963 | Heinze et al. | 244/52 X |
| 3,510,087 | 5/1970 | Strickland | 244/17.19 |

FOREIGN PATENTS OR APPLICATIONS

| | | | |
|---|---|---|---|
| 1,298,518 | 6/1962 | France | 244/17.19 |
| 883,462 | 7/1943 | France | 244/17.19 |

*Primary Examiner*—Milton Buchler
*Assistant Examiner*—Paul E. Sauberer
*Attorney, Agent, or Firm*—Billy G. Corber; Frank L. Zugelter

[57] ABSTRACT

A helicopter devoid of a conventional exteriorly mounted anti-torque rotor and having at the rear end of its aft fuselage a system utilized for auxiliary propulsion and anti-torque and directional control. This combination includes an axial-flow variable-pitch fan, a diffuser, an enlarged duct immediately contiguous to the diffuser, and sets of controllable variable-geometry, series-related, articulatable vanes mounted in a boat-tail configuration at the rear or egress end of the aft fuselage. The fan is located immediately forward of the diffuser, with the duct extending from the diffuser to the vanes, and an air inlet through which the flow of air is induced by the fan is disposed immediately forward of the fan. The vanes operate to dually provide auxiliary thrust and anti-torque control. In operating as an anti-torque control, the flowing air in the enlarged duct is made to converge and accelerate as such air is turned by positioned articulated vanes to achieve maximum efficiency in the production of the required anti-torque force. A pair of spaced elongated slots, with automatically closing lips, extend longitudinally of the fuselage skin, along the enlarged duct and below the sweep of the main rotor, to augment the performance of the basic anti-torque system by inducing a circulation of air around the fuselage which, with the downwash from the main rotor, produces an additional anti-torque force. By varying the pitch of the fan, a large power drain from the main rotor system during critical power-off auto-rotation descents is prevented. The blade pitch also controls auxiliary propulsion thrust, independently of yaw control, while skin friction losses of air flowing in the enlarged duct are minimized.

24 Claims, 17 Drawing Figures

ROTOR POWER REQUIRED - PURE HELICOPTER
(STATE-OF-THE-ART)

REVERSAL OF POWER REQUIRED VS. SPEED

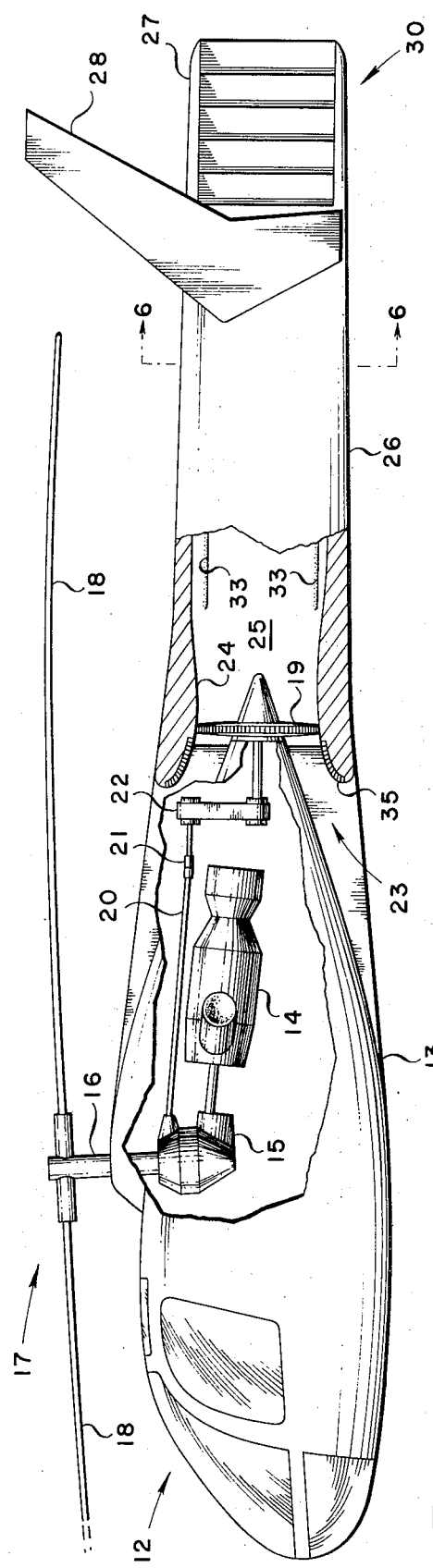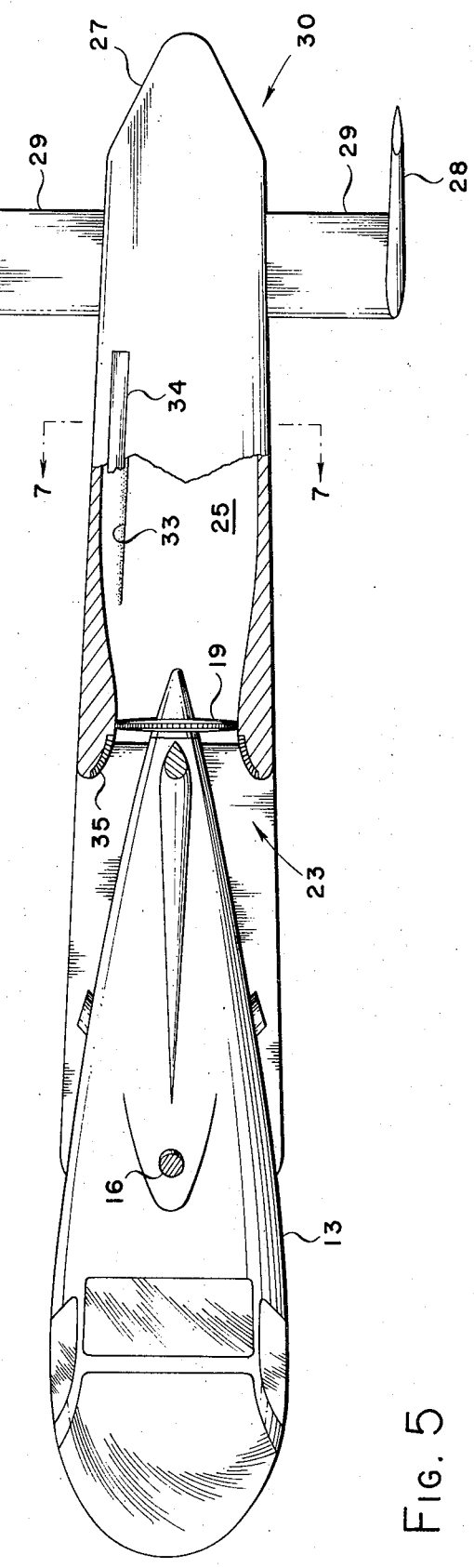

ANTI-TORQUE, PROPULSION, AND DIRECTIONAL CONTROL SYSTEM

STATEMENT OF GOVERNMENT INTEREST

The invention described herein was made in the course of or under a contract with the Department of the Army.

BACKGROUND OF THE INVENTION

1. Field of the Invention. This invention is related to the practice and teachings of the helicopter art.

2. Description of the Prior Art. Examples of helicopter teachings pertinent to this invention and which have been known prior to this invention are found in the disclosures of the following U.S. Pat. Nos. 1,922,167, 2,041,789, 2,461,435, 2,481,729, 2,518,697, 2,547,255, 2,731,215, 3,015,460, 3,026,068, 3,047,254 and 3,059,877.

Other prior art teachings will be found in the disclosures of U.S. Pat. Nos. 2,461,435, 3,081,597, 3,087,303, 3,100,377, 3,126,171, 3,299,638, and British Pat. No. 703,067 (1954).

Problems in the Prior Art

Many efforts to dispose of the anti-torque rotor on a helicopter, without sacrificing performance, power, efficiency or weight, have been made. The examples of the helicopter prior art cited above, however, are not known to perform satisfactorily or efficiently. For example, the concepts of a "tail cone fan" or "lateral jets fed by a rotor-driven compressor" were penalized by high jet velocities, high drag in forward flight due to blunt aft end of the vehicle, high noise level, and excessive power requirements.

A basic concept of this invention which solves these problems involves a main rotor-driven axial compressor fan feeding a variable-geometry nozzle at the end of an enlarged duct extending from a diffuser located immediately adjacent the fan, generating either an anti-torque moment or a forward propulsion thrust, or both.

In this invention, substantial advantages in the utilization of the internal fan concept are obtained, principally those resulting from auxiliary forward flight propulsion, but other advantages, described below, are also obtained.

In addition, the use of tail rotors, during the unloading of troops in a war zone from closely grouped helicopters under combat conditions, or of personnel elsewhere under other conditions, through inadvertent walking into the whirling tail rotors, has caused an alarming number of fatalities. Also, an increasing attrition of rotary wing aircraft is occurring due to tail rotor loss or damage sustained when striking the terrain and other obstacles when operating in unprepared areas. Attempts to solve these problems have been made, but no entirely satisfactory result in terms of constructed, flying helicopters is known to exist. These attempts have included the concept of replacing the tail rotors by other expedients, but at a cost of performance to the vehicle. Examples of these efforts have been utilization of internal fan (and fan-in-fin) concepts. However, several problems associated with such fan concepts have not been overcome. Examples of these efforts are disclosed in the helicopter prior art teachings identified above.

Discussion Re Auxiliary Propulsion

Auxiliary propulsion has long been recognized as a means to improve the forward flight performance of a rotary wing aircraft. Furthermore, it has been shown that when the main rotor is unloaded by a wing and by auxiliary propulsion, the major part of the improvement results from the auxiliary propulsion for speeds below 200 knots. Up to that speed, the main value of a wing is to enhance maneuverability characteristics. In general, however, the true nature of the effect of auxiliary propulsion on cruise performance has not been clearly understood and has been often underestimated.

It has been thought of as a method for obtaining some reduction in power required and in vibration levels at a given speed, or alternately, increasing cruise speed without raising the power requirements or vibration levels. Lighter and more efficient power plants, along with advancing technology for solving vibration problems, have led to a widespread belief that a pure helicopter can be designed to the same performance level as a compound vehicle with auxiliary propulsion by simply trading off the cost of increased installed power and of dynamic refinements for the cost of auxiliary propulsion. To evaluate the validity of this assumption for a hypothetical rotary wing vehicle, a study was made using parameters approximating those of the AH-56A (Lockheed Cheyenne) Compound Helicopter. Results showed that pure helicopters have an absolute speed limit that cannot be exceeded, even with unlimited power available and assuming no limitations imposed by retreating blade stall, vibration, control, etc. See FIG. 1. This speed limit is defined by the relative variations of rotor propulsive force and parasitic drag as functions of nose-down attitude and speed. At speeds in excess of this absolute $V_{max}$, the main rotor was shown to be incapable of generating sufficient propulsive force to match the parasitic drag, regardless of the amount of power supplied to the rotor, or the degree of nose-down attitude. Furthermore, when rotor power was calculated for speeds below this limiting speed, a typical pure helicopter exhibited a power-required curve that rises steeply at the absolute $V_{max}$, and then loops back and continues to increase as the nose-down attitude is pushed beyond that required to reach the absolute $V_{max}$. This interesting characteristic is illustrated in FIG. 1 and explained in FIG. 2. Actual demonstrations of this flight regime have been made by helicopters used to tow other vehicles at low speed, steep nose-down attitude, and maximum engine power. Actual values for this $V_{max}$ and power levels are, of course, dependent on the particular aerodynamic characteristics of any given vehicle. It appears, then, that what have been considered the limiting factors for speed performance of helicopters; namely, excessive vibration, stability and control problems, high stresses, and steep increase in power required, are only symptoms of this more fundamental speed limit.

In the foregoing discussion, it has been shown that the above limitation of pure helicopters arises from the need to generate an increasing propulsive thrust with increasing speed, while maintaining the required lift, and increasing the nose-down attitude and inclined rotor thrust. Auxiliary propulsion relieves the main rotor of the total propulsive thrust requirement, and results in:

1. A level attitude for the rotor;
2. An improvement in the retreating blade spanwise lift distribution and delay of tip stall;

3. Reduction of cyclic trim requirement; nd
4. Flying of the vehicle in a minimum drag attitude.

The combination of these effects eliminates the absolute speed limit and allows the speed performance to be selected at will by choice of installed power and main-rotor parameters (tip speed, solidity, airfoil shape, twist, etc.).

A study of the power required curves, illustrated in FIG. 3 for a pure helicopter and for a compound vehicle with auxiliary propulsion, clearly shows that auxiliary propulsion, rather than refinement to pure helicopters, is actually a means of fundamentally changing the performance capability of rotary wing aircraft through increased productivity, reduced fuel consumption, smaller vehicle size, and improved cruise performance. These forward flight improvements lead to improved hover performance for a specified payload and range (or endurance), due to lower mission fuel weight and weight empty.

SUMMARY OF THE INVENTION

This invention relates to rotary wing aircraft, and in particular, is related to a helicopter devoid of an exteriorly-mounted anti-torque rotor, and having a main-rotor-driven axial compressor fan feeding a flow of air through a diffuser and an enlarged duct to a variable-geometry nozzle generating an anti-torque and/or forward propulsion thrust, or both, and to circulation slots mounted in the fuselage for augmenting such thrusts.

An object of this invention is to provide an anti-torque system in a helicopter which reduces susceptibility to high speed, forward-flight flapping instabilities.

Another object of this invention is to increase the cruising efficiency which, to date, has not been too high in the case of helicopters.

Another object of this invention is to provide efficient yaw and thrust control by the combination of an aft fuselage nozzle arrangement with an internal fan and proper ducting, without excessive aerodynamic drag resulting, and to improve the cruising efficiency of the vehicle by generating additional forward thrust thereby.

A further object of this invention is to augment such yaw and thrust control.

Another object of this invention is to reduce duct air flow losses and efflux velocities.

A still further object of this invention is to reduce to a minimum the turning losses of the internal flow by simultaneously accelerating and turning the flow of air in the duct through a control means in a nozzle.

A further object of this invention is to modulate the pitch of the compressor fan blades relative to the variable-geometry vanes of the nozzle control means, to yield a smooth and continuous variation of yaw control power during the transition from hover to forward flight and vice versa.

Another object of this invention is to provide auxiliary forward thrust while reducing drag characteristics and improving the flight attitude of the vheicle.

Another object of this invention is to insulate rotating machinery completely from terrain contact and one by which ground personnel are not endangered in any way.

Another object of this invention is to supplement the anti-torque force by means of forced circulation, available at negligible cost in the aerodynamic efficiency and performance of a rotary wing vehicle.

Another object of this invention is to reduce the noise level below that associated with a conventional helicopter.

Another object of this invention is to provide maximum performance for a rotary wing vehicle without appreciable drag penalities by utilizing a variable-geometry nozzle having a dual-purpose exit or egress. Specifically, the drag reduction results from a more level flight attitude achieved with the addition of auxiliary forward flight propulsion, and better streamlining of the aft fuselage.

A further object of this invention is to provide acceptable hover performance by utilizing a diffuser and a large cross-sectional duct in cooperative relationship thereto in combination with a relatively large exit or egress, without appreciable drag penalty resulting therefrom.

Another object of this invention is to reduce duct losses and efflux velocities by utilization of such a diffuser and large cross-sectional duct, and thereby reduce the anti-torque power otherwise required.

A further object of this invention is to provide a maximum design simplicity in the drive system for a rotary wing aircraft, by shortening the anti-torque drive shaft and eliminating the tail rotor right angle gearbox of conventional helicopters, with attendant gains in maintainability and reliability thereby.

Another object of this invention is to provide a more level attitude with utilization of auxiliary forward flight propulsion. A reduction in drag is accomplished by such a technique.

A still further object of this invention is to improve the directional stability characteristics of a rotary wing vehicle by removing vertical surfaces from a low energy turbulent wake or poor air flow area behind the main rotor hub and pylon or fairing therefor.

Another object of this invention is to reduce or reverse a download on the aft fuselage due to rotor downwash, and to provide a corresponding net lift resulting from the inclination of the downwash which is produced by slipstream rotation.

Another object of this invention is to provide a major gain in overall performance of a rotary wing aircraft by introducing auxiliary propulsion by means of an internal fan and variable-geometry articulatable vanes.

These and other objects and advantages of this invention will become more fully apparent from a reading of the following description, appended claims thereto, and the accompanying drawing.

BRIEF DESCRIPTION OF THE DRAWINGS

FIG. 4 is an elevational view, partly broken away and partly in cross-section, of an embodiment of the invention.

FIG. 5 is a plan view of such embodiment, partly in cross-section and partly broken away.

DESCRIPTION OF THE PREFERRED EMBODIMENT

Figure 1:
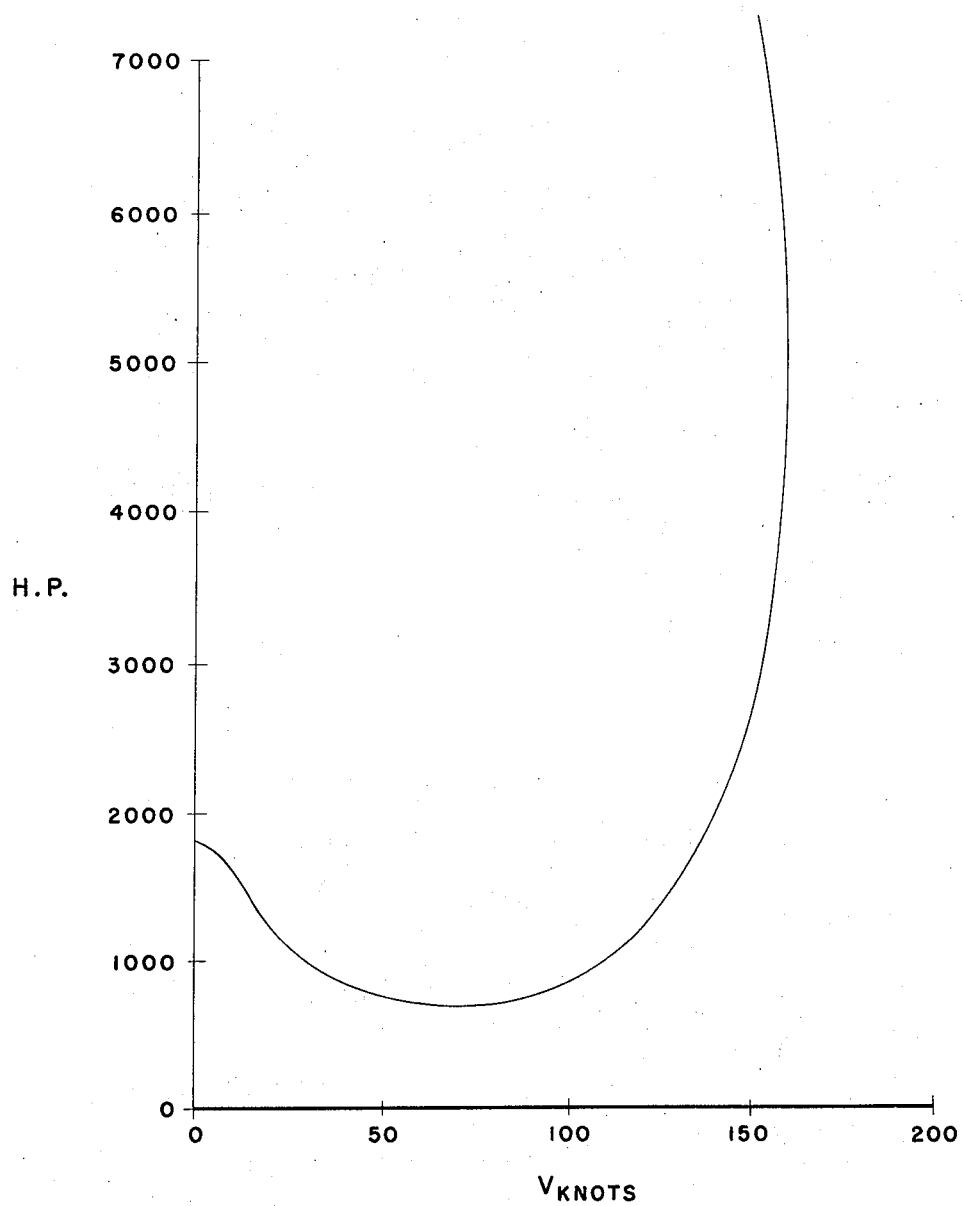
FIGS. 1–3 are graphical illustrations of parameters which influence the results obtained by utilization of the instant invention.
Figure 2:
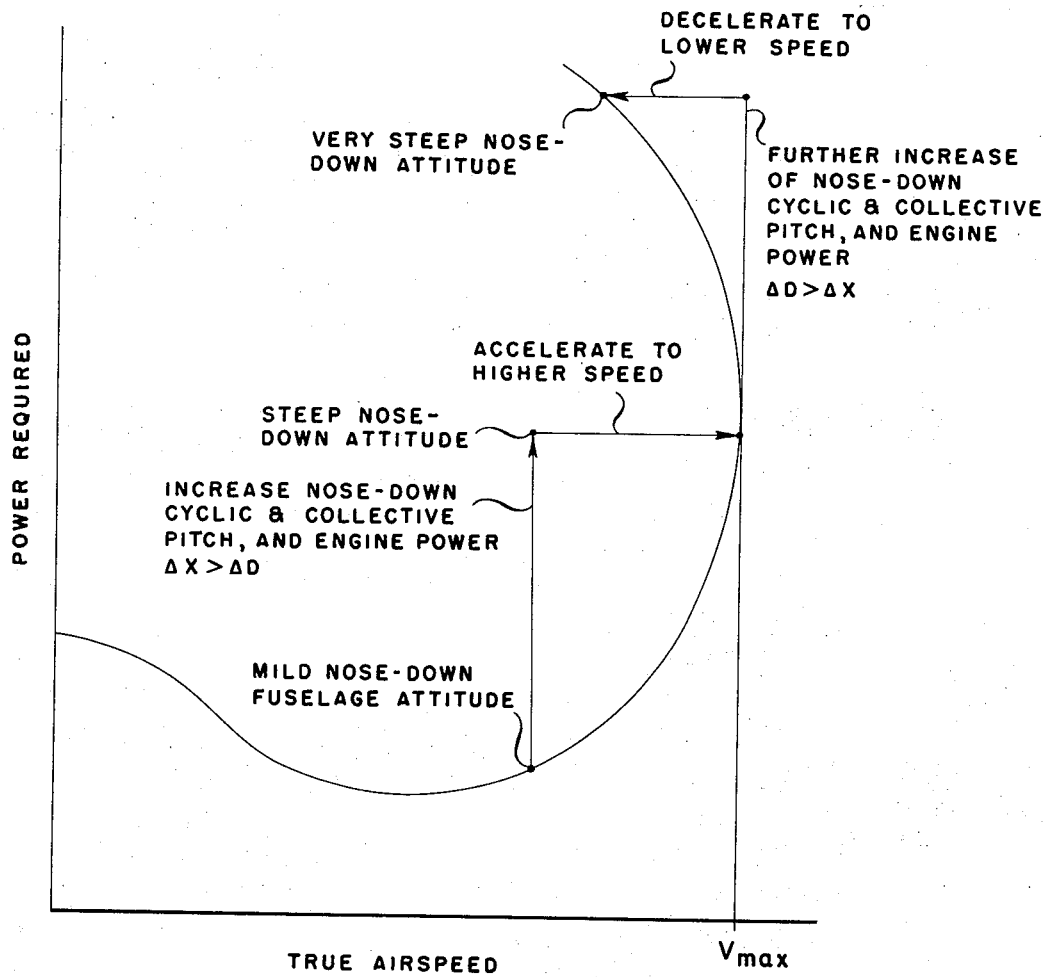

Refer now to the accompanying drawing in which reference characters correspond to like numerals hereinafter.

General Orientation

Figure 7:
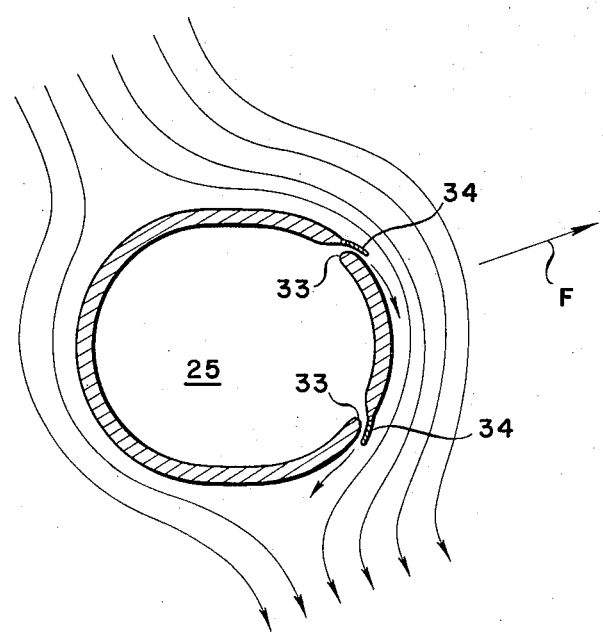
FIG. 7 is a cross-sectional view taken on line 7—7 of FIG. 5.

Reference character 12 (FIG. 4) generally designates a rotary wing vehicle which incorporates the preferred embodiment of the invention. The vehicle 12 comprises a fuselage 13, a primary propulsion engine 14 housed therein for driving, through a transmission 15, a rotor shaft 16 connected to the transmission 15, and to which is mounted a main rotor system 17 including the rotor blades 18, and an axial flow, variable pitch fan 19 mounted in the fuselage 13 to the rear of the engine 14. The fan 19 is of the compression type and is suitably powered off the transmission 15, say, by means of a drive shaft 20 to which a constant angular velocity coupling 21 is attached to drive a belt-and-pulley assembly 22 about the shaft of the fan 19. An air inlet 23 circumscribes the fan 19 immediately forward thereof but to the rear of the housing of the engine 14. A diffuser 24 directly communicates with the fan 19 and with a duct which extends therefrom and throughout an aft fuselage 26 to a boat-tail configuration 27 terminating at the rear of the vehicle 12. Each of a pair of vertical surfaces 28 is mounted on a corresponding horizontal airfoil 29 (FIG. 5) secured to and laterally extending from the aft fuselage 26 forwardly of the boat-tail configuration 27. A nozzle having a variable-geometry means 30 is mounted in the boat-tail configuration 27. The mean 30 comprises two sets 31 of articulating variable-geometry vanes (FIGS. 8–9) each set including a series of vanes 32. The sets 31 are arranged in a converging relationship towards the rear terminus of the vehicle 12 and generally about a vertical plane for the longitudinal axis of the fuselage 13. One or more circulation slots 33 (FIGS. 5, 7) with their corresponding closing lips 34 (FIG. 7) are longitudinally aligned along the aft fuselage 26 and are located under or within the maximum velocity region of the downwash from the main rotor blades 18.

The Air Inlet

Preferably, a large bell-mouthed or lemniscate-shaped structure is utilized for inlet 23. The inlet 23 circumscribes the fuselage 13 forwardly of the fan 19 which by its operation induces air to flow thereinto. However, other known air inlets may be used, should the design of a given vehicle 12 indicate a different configured air inlet would be more aerodynamically efficient. In the instant embodiment, the large bell-mouth structure provided the inlet 23 minimizes flow losses to be found existing at the air inlet leading to the fan 19.

An additional advantage of this invention is the fortunate matching of the airflow through the bell-mouth inlet 23 and the necessary airflow needed to handle the heat rejection of the engine 14 and transmission 15. This suggests the use of a skin radiator 35 (FIGS. 4, 5) to provide cooling for the engine and for the transmission oil without the need for a blower, an oil cooler, and associated ducting. The weight and power of the cooling blower is saved, and the heat transfer radiator is obtained at a minimum weight penalty.

The Aft Fuselage

The significant portion of the fuselage 13 of primary concern in this invention is the aft fuselage 26 (FIG. 4). The aft portion or fuselage 26 comprises an elongated generally large cylindrically configured body which is connected, preferably integrally fabricated, with the fuselage 13. The aft fuselage 26 extends from the rear of the engine 14 through the plane of the axial fan 19, and, as shown in FIGS. 4 and 5, includes the diffuser 24 disposed immediately contiguous to and communicating with the plane of the fan 19 on the one hand, and with the enlarged duct 25 on the other hand. The enlarged duct 25 includes a generally uniform cross-sectional area which extends, as far or as long as possible in a given design of the vehicle 12, to the means 30 or boat-tail configuration 27.

A diffuser is defined here as a duct having its cross-sectional area expanding from its one end to its other end. The effect or function of such a diffuser is to provide for a decrease or slowing down of the velocity of the flow of air drawn into its smaller initial cross-sectional area. Such flow passes at a slower velocity out of its larger outlet end. Thus, the length of the diffuser 24 in this invention is limited only by aerodynamic design of the vehicle 12 which, of course, includes the entirety of the aft fuselage 26. The locating of the fan 19 as far forward in the aft fuselage 26 as possible is advantageous to such design. Not only does this facilitate as long a diffuser as possible prior to its direct communication with the uniform-area duct 25, but also simplifies the drive system for the vehicle in view of the proximity of the fan 19 to the transmission 15. The continuation of the cross-sectional dimensions of the duct 25 directly communicating with the diffuser 24 is maintained as large and as uniform as a given design provides, in order to obtain the exceptionally efficient performance for the vehicle 12 of this invention.

As indicated above, the diffuser 24 and the duct 25 communicate directly with each other. The expanded larger cross-sectional area of the duct 25 continues to and directly communicates with the nozzle control means 30 within the boat-tail configuration 27. This larger duct cross-section, without the adverse effect that otherwise occurs from necking down the duct (friction losses), reduces losses of energy therethroughout by reducing duct flow velocities, and provides for the retention of high pressure in the duct 25. This slower velocity for the air mass moving through the larger or expanded duct 25 is accomplished by including as generous a length of the diffuser 24 as possible and by maintaining the larger cross-sectional area for the duct 25, as described above. A high pressure of the flowing air is nevertheless maintained as it flows at a relatively slower rate through the duct 25 for eventual ingress to the nozzle control means 30 and egress through the articulating vanes 32.

Another advantage in maintaining as long a length as possible in the vehicle 12 behind the fan 19 is the reduction of force required for yaw control, in view of the fact that this length in effect determines the moment arm of the nozzle thrust about the center of gravity of the vehicle.

The Fan

The fan 19 is of the axial flow, variable pitch, compressor type. For example, a fan such as used on a SUD 41 helicopter is adaptable. This would be an economical choice. Or, it could be a fan such as described in a copending patent application, Ser. No. 304,854, filed Nov. 8, 1972. The shaft of the fan 19 is driven by the belt-and-pulley assembly 22, and through coupling 21 and drive shaft 20, is geared directly to the main rotor drive system, the fan 19 being powered independently of engine operation. The pitch of its blades is also increased automatically as a function of either right or left rudder pedal displacement. Suitable linkage elements (not shown), known in the art, connect the blade pitch control mechanism to the rudder pedals.

The fan 19 is disposed at a foremost forward location as possible, relative to the diffuser 24 and the duct 25, and as close to the engine 14 as design permits. This results in maximum utilization of the aft fuselage 26. Furthermore, the internal installation of the fan 19 reduces hazards to personnel to nearly zero and minimizes vulnearbility to terrain-contact damage.

It should be understood that a variable speed, fixed-pitch fan may also be used.

Forced Circulation Slots

The use of the "magnus effect" produces a substantial side force on a cylindrical body immersed in a transverse fluid flow by inducing a circulation component force in a direction normal to the airflow. In this invention, this induced flow circulation is used in conjunction with the internal fan, anti-torque configuration described and shown herein. Although limited to powered hovering or low speed flight, a useful auxiliary anti-torque force augmentation is obtained by use of that principle. The induced forced circulation is obtained by providing one or more longitudinal slots 33 around the aft fuselage 26 under the maximum velocity region of the downwash created by the rotor blades 18. The slots 33 are normally closed by means of spring-loaded lip or door elements 34 suitably mounted across the slots 33. These slots 33 open only under maximum control requirements when the increased pressure in the duct 25 forces the spring loaded lips 34 to open slightly, thereby blowing thin high velocity tangential airjets fed by the duct 25 between the fan 19 and the nozzle to the exterior of the aft fuselage 26 to interact with the rotor downwash to produce a force F as shown by the arrow in FIG. 7. This results in the advantages of anti-torque force augmentation at minimum cost in power and complexity (when torque is greatest), and prevents a power drain under critical power-off autorotation when control requirements are less severe, and reduces or reverses the usual download on the aft fuselage 26 due to rotor downwash. This latter gain results from the combination of two effects. First, the slots 33 energize the boundary layer and tend to prevent flow separation in the lower surface of the fuselage 26. This reduces the high download or drag characteristics of airflow normal to a blunt unfaired cylindrical shape. Secondly, a net lift results from the inclination of the downwash produced by slip stream rotation. This inclination, corresponding to the helix angle of the slip stream, inclines the side force upward as shown by the arrow in FIG. 7, thereby providing a lift component. All of these advantages overcome the prior art difficulties 1) that forced circulation was not capable of completely handling yaw requirements in hovering flight and 2) that rudder pedal movement did not provide yaw control at low or zero speed, with the engine inoperative.

It should now be evident that the subject matter of this invention lends itself ideally to this augmentation, since the required source of compressed air and a relatively large cylindrical shape lying in the way of a maximum rotor downwash is already available, all obtained at minimum cost in power and complexity.

The Vertical Surfaces

Figure 6:
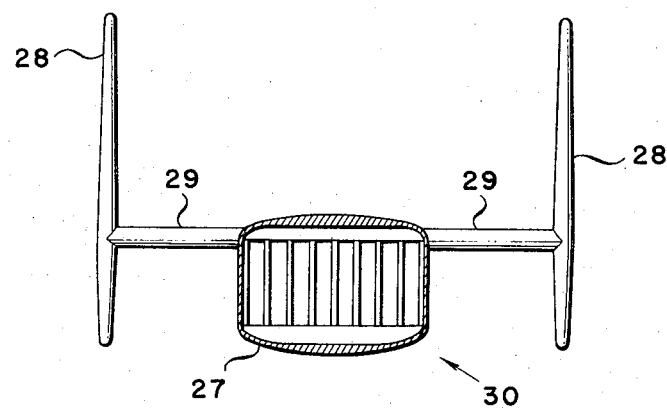
FIG. 6 is an end view of FIG. 4.

Many helicopters experience reduced yaw stability at low angles of side slip, thus affecting their directional stability characteristics. This problem of reduced stability has been identified as being caused by the fin and tail rotor of the vehicle being in a low energy turbulent wake behind the main rotor hub and pylon, rather than by tail rotor load reversal. In this invention, twin fins 28 (FIGS. 4, 5 and 6) are provided, and are mounted in a manner to avoid or be clear of this region of poor airflow. In the instant illustrated embodiment, these surfaces 28 are suitably mounted on the horizontal airfoils 29. The instant embodiment has the further advantage of maintaining good stability at high angles of attack in steep autorotation descents.

The Nozzle Configuration and its Variable-Geometry Features

Figure 8:
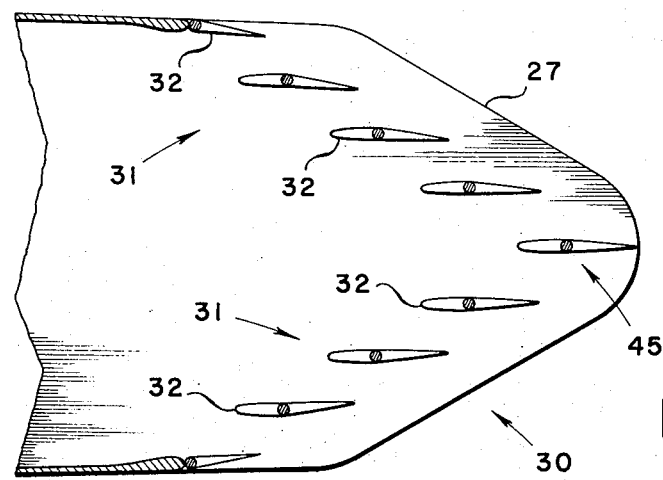
FIG. 8 is a plan view of the variable-geometry nozzle disposed at the terminus of the aft fuselage of a compound helicopter, showing its articulatable vanes in their normally open position (forward flight mode).
Figure 9:
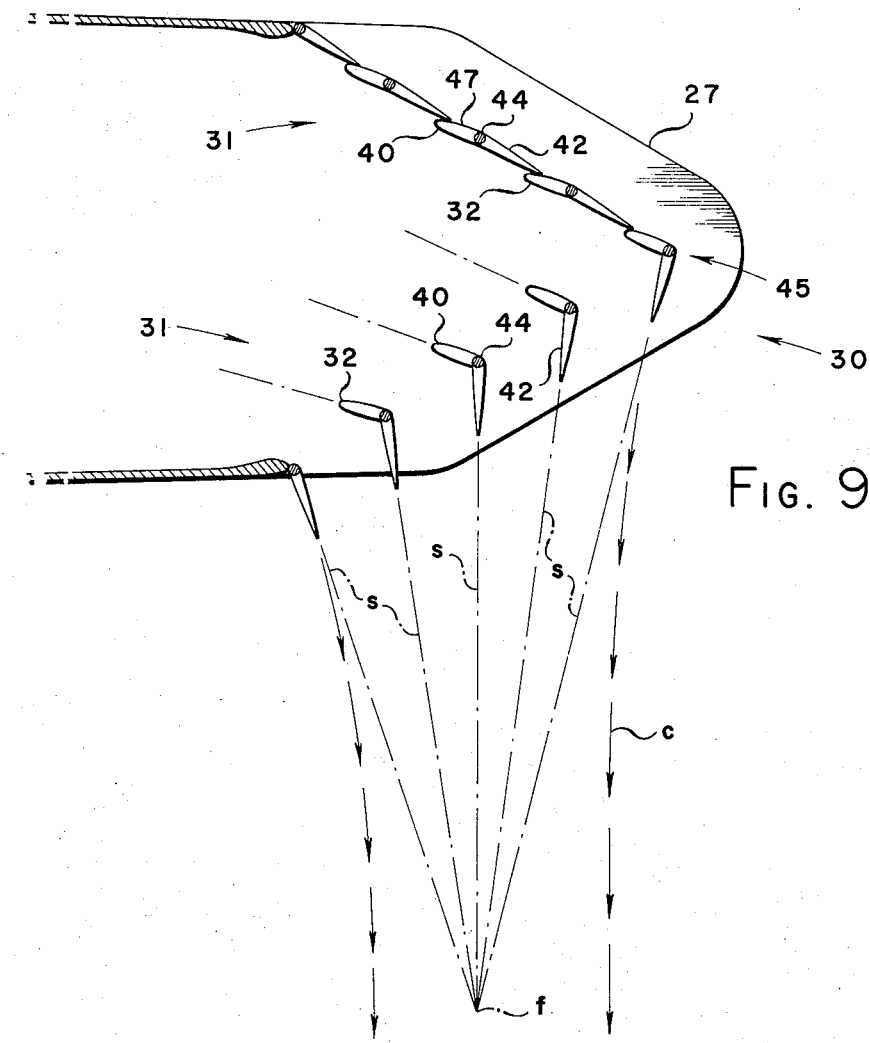
FIG. 9 is a view similar to FIG. 8, however, one set of vanes is shown in fully closed positions, while a second set of vanes has been articulated to an open position different than that shown in FIG. 8 (hover mode).

As illustrated in FIGS. 8 and 9, the means 30 for the nozzle comprises two sets 31 each of which includes a series of variable-geometry articulating vanes 32. FIG. 8 illustrates the vanes 32 of each set 31 in forward thrust position and zero rudder pedal displacement. FIG. 9 illustrates the positioning of both sets 31 for maximum anti-torque and (left) yaw control conditions, and wherein a converging flow of air egresses from the nozzle.

Each vane 32 in a set 31 is an airfoil-shaped element having two rotatable members 40, 42, each rotatably mounted on a rod or post 44 coincident upon a vertical axis of the vane. Each post 44 is suitably connected at its ends in known manner to the frame of the boat-tail configuration 27. Each post 44 is spaced in a parallel manner from the next adjacent post 44 whereby its vane 32 is in overlapping relationship to its next adjacent vane 32 for maximum anti-torque and yaw control conditions and as illustrated in the upper half of FIG. 9.

Figure 15:
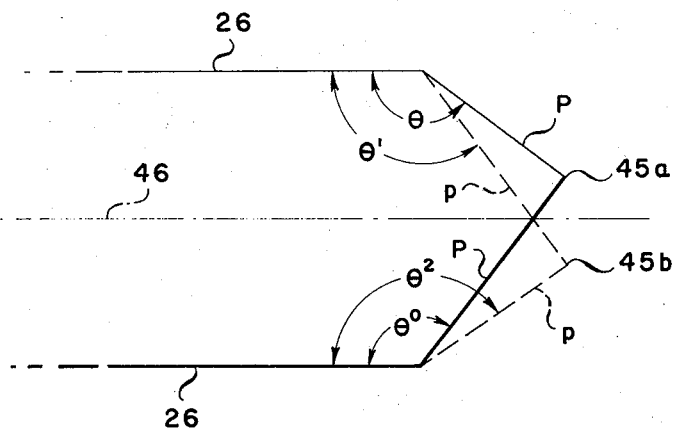
FIGS. 15, 16, and 17 illustrate modifications for construction of the variable-geometry nozzle.

The vertical axis or post 44 for each vane 32 in each set 31 lies in a plane which is the plane of the vanes for a set 31. Each of such planes is vertically oriented to the vehicle 12 and intersects its respective vertical wall or walls of the aft fuselage 26, on the one hand, and intersects the other of such planes to form a linear apex 45 in the nozzle configuration. It should be understood that although the preferred embodiment of the invention is shown to locate the apex 45 on the center line or longitudinal axis 46 of the vehicle 12, as shown in FIGS. 8 and 9, such location of the apex 45 is not restricted thereto. It may lie to either side of such center line 46 as shown in the illustration of FIG. 15. The solid lines shown in FIG. 15 represent the planes P of the vanes 32 the apex 45a of which planes P are displaced to one side of the center line 46, while the phantom lines p represent such planes in the case of their apex 45b being displaced to the other side of the center line 46.

Figure 16:
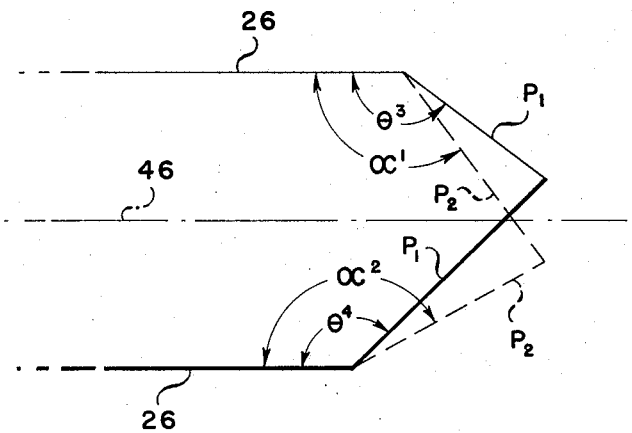
Figure 17:
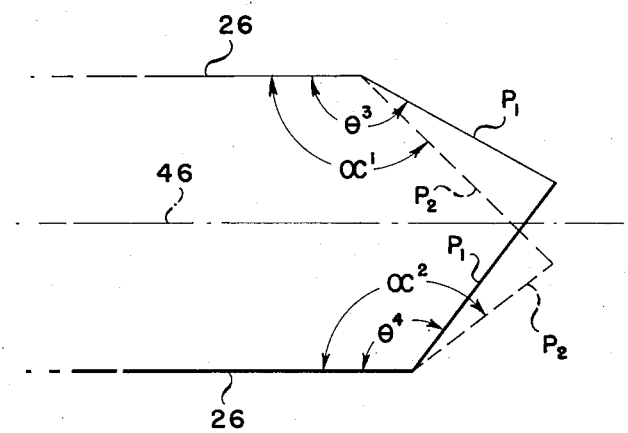

Furthermore, as shown in FIGS. 16 and 17, the intersection of both of the planes $P_1$, $P_2$ of the vanes with the vertical wall or walls of the aft fuselage 26 need not necessarily intersect on the same fore-and-aft location.

Also, the degree or amount of displacement of either apex 45a, 45b from the center line 46 is limited only by the inclusion of corresponding obtuse angles $\theta$ and $\theta^0$ $\theta^1$ and $\theta^2$ (FIG. 15), or $\theta^3$ and $\theta^4$ or $\alpha^1$ and $\alpha^2$ (FIGS. 16, 17), as the case may be, formed by the vertical plane of each set with the wall of the aft fuselage 26 with which such set is connected.

It should now also be evident now that the intersection of both of the planes of the vanes with the vertical wall or walls of the aft fuselage 26 need not necessarily intersect on the same fore-and-aft location in the case of the apex of such planes falling on the center line 46.

It may be noted that the vane 32 mounted at the apex 45 of the sets of variable geometry vanes in the nozzle is made to dually function; i.e., function for each of the two vane sets 31 when one of a vane sets is turned from its full forward thrust position to either one of the positions for the vane sets 31 illustrated in FIG. 9.

Each member 40, 42 (FIG. 9) rotates about its post 44 in a predetermined way in relation to the other members 40, 42 by means of suitable linkage provided to control and regulate the turning movement for the means 30. Such type of linkage is well-known in the art and need not be described in detail here, except to point out that such linkage is suitably connected to the forward flight pilot control in the cockpit and to the rudder pedals. It should be understood that although FIG. 9 illustrates extreme positions to which either vane set 31 can be turned or maneuvered in controlling the nozzle, an infinite number of cooperating and effective positions between both sets 31 together with corresponding turning movement for each pair of members 40, 42 in a set 31 may be obtained throughout their turning motions between the illustrated two extreme positions, maximum open and closed.

The exact turning movement for each member 40, 42 about their post 44 in a cooperating pair constituting a vane 32 is not exactly the same as such movement for the panels or members in the other vanes of a set 31. This is shown by the positions of the vanes in the lower half of FIG. 9. A different angularity is established between the members 40, 42 for one vane 32 than for those in each of the other vanes 32 to achieve their effective positions. Such differences in movements provide each articulating vane 32 with a particular pattern of movement and which is known and described as a variable geometry vane.

The relative positions for each set 31 in FIG. 9 may, of course, be reversed. In the closed position for a set 31, however, the free or trailing end of its member 42 has rotated inward to abut an exteriorly disposed face 47 of the panel 40 of the next adjacent vane 32 (FIG. 9), such that egress of air through such abutment cannot occur but rather, its flow continues within the confines of and is partially turned in the nozzle itself.

The direction of the flow of air from the nozzle having one set of vanes closed and for any open position involving a turning motion from full forward thrust position for the other set of vanes forms an air column c (FIG. 9) of smaller cross-sectional area than that of the aft fuselage 26. To provide for this smaller column, the members 40, 42 of the airfoil-shaped elements in the one set 31 are turner or rotated so as to converge generally towards a focal point or focus $f$ (a geometrical line) in space generally established by geometrical lines drawn and coinciding with the planes s of the members 42 which are disposed in such an open position. This is clearly illustrated in the lower half of FIG. 9. Thus, the large volume of air egressing from the nozzle is controlled by this variable-geometry dual purpose nozzle and the aerodynamic drag which heretofore would normally result from a large blunt aft fuselage exit is advantagoeusly counteracted by the thrust produced in any direction through the nozzle.

An important distinction over prior art teachings and concerning such control of air should be carefully noted here, in that the flow of air is already partially turned in the nozzle before striking the set 31 of vanes positioned for a convergent flow of air (the lower set in FIG. 9). Furthermore, the cross-sectional area of the nozzle egress area has been taught in the past to be either the same as that of the aft fuselage or of a narrower or more constricted cross-section. Although the efflux velocity of air flow, in prior art devices, as it would egress from the nozzle would be either the same as that in the aft fuselage or substantially greater, efficiency nevertheless was substantially reduced. This was primarily because of the instantaneous or sharp 90° turn required for the flow of air. In this invention the aerodynamic efficiency of the elbow-nozzle combination is increased from 85 percent to as much as 93 percent by: (1) partial turning of the flow by the opposite set of vanes in the closed position prior to entering the open set of vanes, and (2) simultaneously turning and accelerating the flow through the open set of vanes. The flow conditions in turning vanes is improved by accelerating the flow as it is turned, thereby alleviating adverse pressure gradients and flow separation. The control means of this invention provides a diminishing cross-sectional area of the air flow from the straight duct to the final exit area, to give an increasing flow velocity as the air is turned to a lateral flow direction.

Operation of the System

The vane sets 30 are normally in the open forward-flight position and the blades of the fan 19 are maintained at a minimum pitch. In a hovering mode of operation, a right-or a left-pedal displacement by the pilot initiates a closing of the left or right vane set 30, respectively, and a proportional increase in the angle of the fan blades. Keeping the fan blades at low pitch during small rudder pedal displacements prevents a large power drain from the main rotor system during critical power-off autorotation descents. As forward flight increases, the pilot selects the amount of forward flight propulsion thrust by increasing the fan blade pitch independently of rudder pedal displacement. Automatically and simultaneously, the degree of rotation of both sets of nozzle vanes for any given rudder pedal position is varied inversely proportional to forward thrust demand. This yeilds a smooth and continuous variation of yaw control power during transition from hover to forward flight with auxiliary propulsion. It is recognized that engineering design of the control system must be preceded by a thorough analysis of control sequencing for the fan pitch and deflector vane angles to eliminate nonlinearities and dead-band.

It should be understood that the invention comprehends use of a high-pressure-ratio supersonic fan such as are currently employed in modern turbofan engines.

Figure 14:
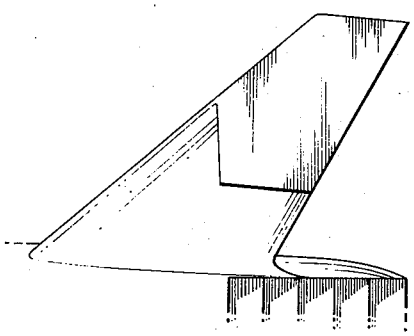
FIG. 14 is a side elevational view taken of FIG. 13.
Figure 13:
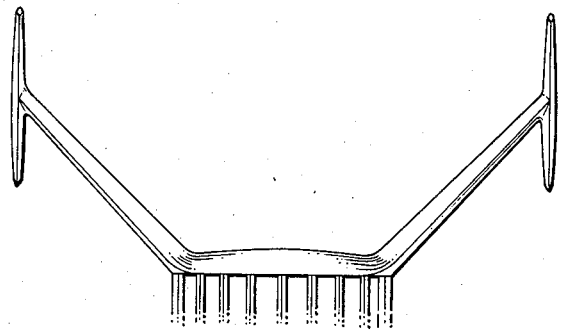
FIG. 13 illustrates a modified embodiment of the vertical control surfaces illustrated in FIG. 6.
Figure 3:
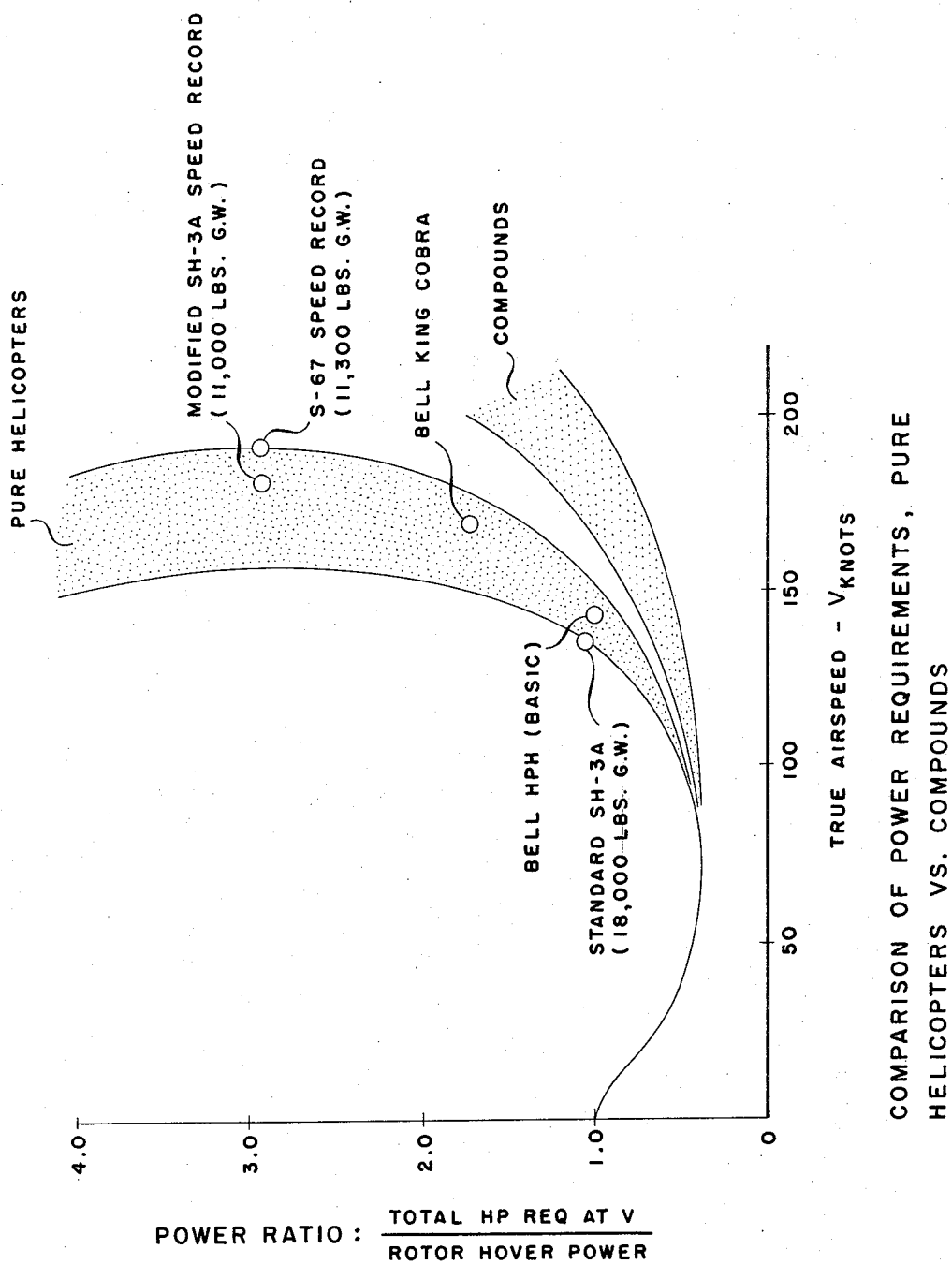
Figures 10, 11:
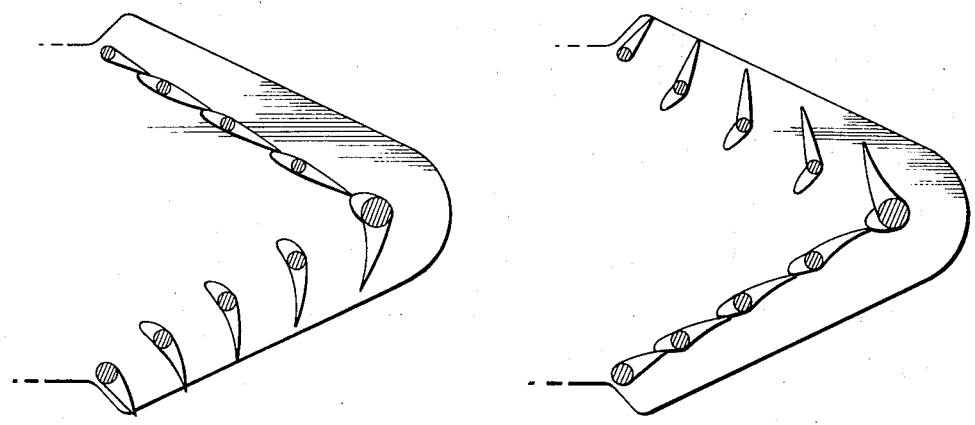
FIGS. 10, 11, and 12 illustrate a modified embodiment of that shown in FIGS. 8 and 9.
Figure 12:
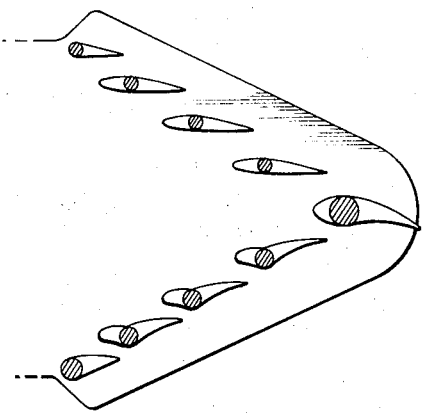

FIGS. 10, 11, and 12 represent modified configurations for the vanes 32 and which may be utilized in the practice of the invention. Similarly, FIGS. 13 and 14 represent modified constructions and arrangements of the horizontal airfoils and vertical surfaces for such utilization.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim is patentably novel is:

1. An improvement in a nozzle adapted to be mounted at the rear terminus of a rotary wing vehicle and through which air is being directed thereto for ingress and engress therethrough,
    said nozzle comprising
    a pair of sets of vanes each of said sets comprising a series of vanes functioning between a maximum open position, a full forward thrust position, and a closed position,
    said sets lying generally in first and second planes which intersect thereby establishing an apex for said sets of vanes,
    said apex opposing an ingress of a cross-sectional area to the nozzle,
    the improvement comprising
    each of said vanes in each of said sets comprising a pair of articulatable panels rotatable about a common post, each vane in different angularity in its pattern of movement than that of any other vane in its series in any open position for its set when said set is in turned motion from a full forward thrust position or from a closed position,
    a flowing column of air being established by said set when in a turned motion position,
    whereby the final cross-sectional flow area of the air column is less than the cross-sectional flow area of said egress to said nozzle.

2. The improvement of claim 1 in combination with a fuselage having an aft body in which said nozzle is mounted at its rear terminus,
    said aft body including a diffuser structure and an enlarged duct,
    a fan mounted in the forward end of said aft body for intake of air,
    an air inlet cooperatively related to said fan,
    said diffuser structure cooperatively connecting said fan to said enlarged duct for expanding the flow of air thereinto,
    whereby air drawn into said diffuser structure, and thereafter flowing through said enlarged duct and nozzle by operation of said fan upon said air inlet provides for forward auxiliary propulsion and antitorque thrust.

3. The subject matter of claim 2 wherein said enlarged duct has a substantially uniform cross-sectional area.

4. The subject matter of claim 2 wherein a skin radiator is mounted on said body at said air inlet.

5. The subject matter of claim 2 further characterized by including
    at least one elongated slot with automatically closing lip means therefor extending longitudinally in said aft body and along said enlarged duct,
    such a said slot being disposed within the path of downwash from the main rotor, thereby providing for auxiliary anti-torque and lift force components.

6. The subject matter of claim 2 further characterized by including
    vertical stabilizers connected to said aft body and being disposed out of the poor or turbulent air flow behind the main rotor.

7. The subject matter of claim 6 further characterized by said vertical stabilizers being supported by airfoils secured to said aft body.

8. The subject matter of claim 7 wherein said airfoils are horizontal.

9. The subject matter of claim 7 in which the apex established by the intersecting vertical planes of each set of vanes constitutes a line intersecting the longitudinal axis for the rotary wing vehicle.

10. In a rotary wing vehicle having no anti-torque rotor,
    the improvement comprising
    a fuselage having an elongated aft body formed as a generally large cylindrical configuration having forward and terminal ends disposed at respective opposite ends of said body,
    a fan mounted across the forward end of said body,
    an air inlet disposed at the forward end of and circumscribing said body,
    a duct enlarged relative to said inlet and being disposed in said body,
    a diffuser structure cooperatively connecting said fan to said enlarged duct for expanding the flow of air thereinto,
    said fan inducing air from said inlet and discharging same directly into said diffuser structure,
    a nozzle communicating with said enlarged duct and being mounted on the terminal end of said body, and
    a plurality of variable-geometry vanes mounted in said nozzle, said plurality being characterized by being divided into two sets, the vanes in each set constituting a series thereof functioning together between a maximum open position, a full forward thrust position, and a closed position, said sets respectively lying generally in first and second planes generally vertically oriented relative to the vehicle, each of such generally vertical planes intersecting said body to which a corresponding one of said sets is connected and intersecting the generally vertical plane for the other set thereby establishing an apex for said plurality, the vanes in each series being in overlapping relationship with each other in such series when in the closed position for such series, each of said vanes in each of said sets comprising a pair of articulatable panels rotatable about a common post, each vane in different angularity in its pattern of movement than that of any other vane in its series in any open position for its set when said set is in turned motion from a full forward thrust position or from a closed position, a flowing column of air being established by said set when in a turned motion position, whereby the final cross-sectional flow area of the air column is less than the cross-sectional flow area of said enlarged duct.

11. The vehicle of claim 10 wherein said enlarged duct has a substantially uniform cross-sectional area.

12. The improvement of claim 10 in which the apex established by the intersecting vertical planes of each set of vanes constitutes a line intersecting the longitudinal axis for the rotary wing vehicle.

13. The subject matter of claim 10 further characterized by including at least one elongated slot with automatcially closing lip means therefor extending longitudinally in said body and along said enlarged duct, such a said slot being disposed within the path of downwash from the main rotor, thereby providing for auxiliary anti-torque and lift force components.

14. The subject matter of claim 13 including vertical stabilizers connected to said body and being disposed out of the poor or turbulent air flow behind the main rotor.

15. The subject matter of claim 14 wherein said vertical stabilizers are supported by airfoils secured to said body.

16. The subject matter of claim 15 wherein said airfoils are horizontal.

17. The improvement of claim 15 in which the apex established by the intersecting vertical planes of each set of vanes constitutes a line intersecting the longitudinal axis for the rotary wing vehicle.

18. A rotary wing vehicle comprising in combination a fuselage including an elongated aft body formed as a generally large cylindrical configuration having forward and rear ends, a main rotor system mounted to said fuselage in front of the forward end of said configuration, means for driving said rotor system, a fan mounted in the forward end of said configuration, an air inlet cooperatively related to said fan, said fan being operatively connected to said main rotor system, a duct enlarged relative to said inlet and being disposed in said body, a diffuser structure cooperatively connecting said fan to said enlarged duct for expanding the flow of air thereinto, and a nozzle mounted at the rear end of said body and communicating with saie enlarged duct, said diffuser structure cooperating with said fan to deliver air drawn into said air inlet and through said fan into said enlarged duct whereby the velocity of the air drawn into said enlarged duct is decreased while its pressure is increased, said nozzle including two sets of variable-geometry vanes, the vanes in each set constituting a series thereof functioning together between a maximum open position, a full forward thrust position, and a closed position, said sets respectively lying generally in first and second planes generally vertically oriented relative to the vehicle, each of said generally vertical planes intersecting said body to which a corresponding one of said sets is connected and intersecting the generally vertical plane for the other set thereby establishing an apex for said sets, the vanes in each series being in overlapping relationship with each other in such series when in the closed position for such series, each of said vanes in each of said sets comprising a pair of articulatable panels rotatable about a common post, each vane in different angularity in its pattern of movement than that of any other vane in its series in any open position for its set when said set is in turned motion from a full forward thrust position or from a closed position, a flowing column of air being established by said set when in a turned motion position, whereby the final cross-sectional flow area of the air column is less than the cross-sectional flow area of said enlarged duct.

19. The improvement of claim 18 in which the apex established by the intersecting vertical planes of each set of vanes intersects the longitudinal axis for the rotary wing vehicle.

20. The vehicle of claim 18 wherein said enlarged duct has a substantially uniform cross-sectional area.

21. The subject matter of claim 18 further characterized by including at least one elongated slot with automatically closing lip means therefor extending longitudinally in said body and along said enlarged duct, such a said slot being disposed within the path of downwash from the main rotor, thereby providing for auxiliary anti-torque and lift force components.

22. The vehicle of claim 18 further characterized by including vertical stabilizers connected to said body and being disposed out of the poor or turbulent air flow behind the main rotor.

23. The vehicle of claim 22 wherein said vertical stabilizers are supported by airfoils secured to said body.

24. The vehicle of claim 23 wherein said airfoils are horizontal.

* * * * *